United States Patent [19]
Martinez

[11] Patent Number: 5,247,395
[45] Date of Patent: Sep. 21, 1993

[54] THIN FILM MIRROR

[76] Inventor: Eugene Martinez, 3 Woodbine Rd., Irvington, N.Y. 10533

[21] Appl. No.: 881,435

[22] Filed: May 11, 1992

[51] Int. Cl.⁵ .............................................. G02B 5/08
[52] U.S. Cl. .................................. 359/883; 428/912.2
[58] Field of Search ............................ 359/883, 847; 428/912.2

[56] References Cited

U.S. PATENT DOCUMENTS

| | | |
|---|---|---|
| 3,687,524 | 8/1972 | Martinez . |
| 3,757,479 | 9/1973 | Martinez ............................ 52/222 |
| 3,792,917 | 2/1974 | Martinez . |
| 3,877,139 | 4/1975 | Martinez ............................ 29/469.5 |
| 3,880,500 | 4/1975 | Kojabashian . |
| 3,936,159 | 2/1976 | Pavenick ............................ 359/847 |
| 3,973,834 | 8/1976 | Penn et al. . |
| 4,483,323 | 11/1984 | Murphy ............................ 359/847 |
| 4,666,263 | 5/1987 | Petcavich . |
| 5,014,174 | 5/1991 | Won et al. ............................ 359/883 |

Primary Examiner—Bruce Y. Arnold
Assistant Examiner—J. P. Ryan
Attorney, Agent, or Firm—Darby & Darby

[57] ABSTRACT

A thin plastic sheet having a reflective material on one surface. Sandwiching the reflective layer is an environmental protective coating of plastic resin. In the preferred embodiment, this protective coating also functions as an adhesive for face bonding the film to a mirror frame. In an alternate embodiment, the protective coating is positioned at the reflective surface and an additional adhesive is preferred. This film construction provides a first surface mirror without the disadvantages of prior mirrors. A method of making a mirror is also disclosed.

12 Claims, 1 Drawing Sheet

THIN FILM MIRROR

FIELD OF THE INVENTION

This invention relates generally to structures for reflecting images. More specifically, this invention relates to mirror structures created with reflective thin film material.

BACKGROUND OF THE INVENTION

While glass mirrors have been common for centuries, they are not always appropriate for certain locations or situations, such as in public washrooms, gyms, locker rooms, etc., where the opportunity for vandalism and accidents or the possibility of liability from injury due to broken glass is increased. In these locations, builders have searched for other materials to be able to provide the washroom patrons with the amenities of a mirror, without the accompanying risk.

Additionally, such mirrors have found usage in optical systems such as large television sets, but they suffer from the same problems (i.e., breakage during shipment, handling or even manufacture).

For many years, polished metal plates have been used in this situation but with only partial success. While the plates are much sturdier and less likely to cause injury, the quality of the mirror is significantly decreased. The plates can become warped or dented, distorting the image. They also tend to have poor reflective characteristics thereby making the mirror image darker and harder to see. Mounting and/or replacing the plates can also become time-consuming and costly, since the plates are usually mounted to a wall by semi-permanent fasteners.

In any of these situations, glass mirrors can also have their own drawbacks. First, they are generally quite heavy and break easily. Because the glass must be relatively thick to avoid being easily broken, the mirror image can be degraded, as the thick glass absorbs or diffuses some of the light passing through. Additionally, with the reflective material at the back of the glass for protection purposes, a dual image can occur from a slight reflection off the front surface of the glass, which then becomes a second reflective surface.

Glass is often molded and is therefore easily susceptible to imperfections in its thickness and planar surfaces. This results is warped and distorted images, such as those in carnival mirrors, although to a lesser extent.

To overcome these deficiencies, glassless mirrors have been developed that use thin reflective films as the reflective surfaces. U.S. Pat. No. 3,880,500 discloses a mirror having a thin reflective film stretched over a rectangular frame. The thin film consists of a plastic sheet with a vacuum deposited reflective layer of metal on one surface. To protect the layer of metal, the sheet is usually mounted with the metal layer facing inwardly. The plastic sheet acts as the reflective surface. The plastic sheet is thin enough to eliminate any double images due to a second reflective surface and is considered a first surface mirror. Some advantages of this type of mirror are that it is lightweight, economical, somewhat durable, and will not pose a hazard if broken.

In the mirror shown in U.S. Pat. No. 3,880,500, there are two films on opposite faces of the frame, secured to the frame edges through the use of contact cement or other adhesive. These two films and the frame enclose an inner volume of air that is in constant contact with the metal surface of the film. One drawback of this configuration is that the exposure to air and its constituents will likely lead to corrosion of the metal layer. If the layers are reversed, with the metal layer facing out of the mirror, it will be exposed not only to the air and its components, but to physical damage caused by incidental contact.

SUMMARY OF THE INVENTION

It is thus an object of the invention to provide a thin film mirror that is protected from the ambient atmosphere and incidental contact.

It is a further object of the invention to provide a mirror with simplified means for attaching the thin film to a mirror frame.

In accordance with the above-mentioned and other objects, a thin plastic sheet is provided with a reflective material on one surface. Sandwiching the reflective layer is an environmental protective coating of plastic resin. In the preferred embodiment, this protective coating also functions as an adhesive for face bonding the film to a mirror frame. In an alternate embodiment, the protective coating is positioned at the reflective surface and an additional adhesive is preferred. This film construction provides a first surface mirror without the disadvantages of prior mirrors. A method of making a mirror also disclosed.

BRIEF DESCRIPTION OF THE DRAWINGS

These and other objects, advantages, embodiments will become apparent to those skilled in the art upon reading the detailed description of the preferred embodiments in conjunction with a review of the appended drawings, in which.

DETAILED DESCRIPTION OF THE PREFERRED EMBODIMENTS

Figure 1:
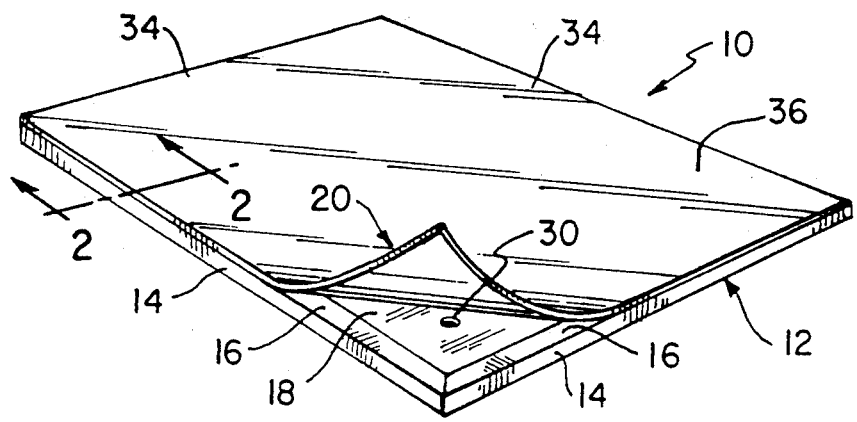
FIG. 1 is a perspective view of a mirror constructed according to the present invention.

Referring to the drawings, there is shown in FIG. 1 a lightweight thin film mirror 10 constructed according to the present invention. A frame 12 is provided and is preferably polygonal having any number of sides. For example, the mirror 10 may have a rectangular configuration as shown. Alternately it may be triangular, octagonal, circular, or any other geometric shape. The frame 12 is comprised of molded, stamped or formed members 14 having a raised film support surface 16 along its entire periphery. The inner area 18 surrounded by the raised support surface 16 is recessed from the level of the support surface 16 so as to not interfere with the mirror film 20 when it is stretched across the frame 12.

The frame 12 can be formed as a one-piece item or formed from several pieces. It is important to maintain tight tolerance with respect to the co-planar nature of the entire support surface 16 so that the mirror film 20 will be planar when adhered to it. The frame 12 is preferably formed from aluminum or other metal members 14 along the periphery.

Figure 2:
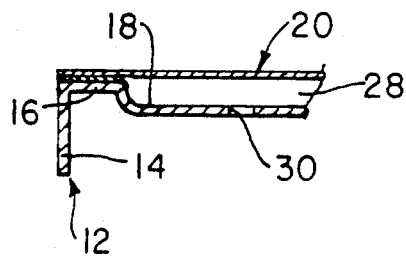
FIG. 2 is a cross-sectional view thereof taken along line 2—2 of FIG. 1.

Referring now to FIG. 2, there is shown a cross-sectional view taken along the lines 2—2 of FIG. 1. A sheet of thin metallized mirror film 20 is positioned on the raised support surface 16 of the frame 12, and stretched above and across the inner area 18. The base of the thin mirror film is preferably a plastic sheet 24, such as a polyimide or a polyester such as polyethylene terephthalate. To give the film reflective characteristics, the plastic sheet 24 has a vacuum deposited reflective layer 26 of aluminum, silver, chromium and the like on one surface.

In the preferred embodiment, this reflective layer 26 is oriented toward the inner area 18 of the frame 12, with an air gap 28 between the frame 12 and film 20. This pocket of air 28 is preferably vented to the surrounding atmosphere through vent holes 30. This ventilation is necessary to compensate for surrounding air pressure changes, which would distort the stretched thin mirror film 20 if the recess 18 was sealed. A by-product of this venting is the contact between the ambient air and its constituents and the mirror film, thereby inviting corrosion of the metal reflective surface.

To prevent any environmental damage to the reflective layer 26, on the surface of the reflective layer 26 opposite to the thin plastic sheet 24 there is provided a protective layer 32, preferably a coating of plastic resin. The resin coating 32 is preferably acrylic and can be applied in one or several coats, to achieve complete coverage of the metal reflective layer 26.

Figure 3:
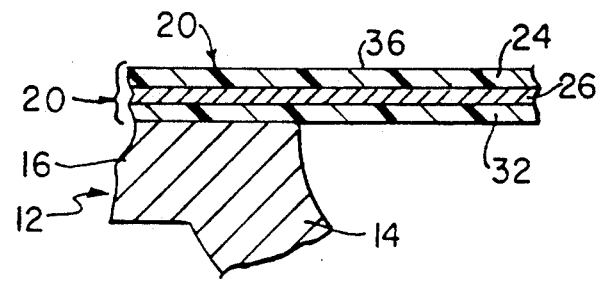
FIG. 3 is a detail cross-sectional view of a mirror according to the preferred embodiment.

As shown in FIG. 3, with the protective coating 32 in contact with the frame support surface 16, it is preferred to stretch the thin mirror film 20, apply it to the support surface 16 and adhere the film 20 to the support surface 16 only with the application of heat. In this embodiment, the resin coating 32 also functions as a thermoplastic adhesive, obviating the need for any additional adhesives. Alternately, some thin film mirrors are known to have the thin plastic sheet 24 tensioned after adhering it to the frame 12 in order to achieve a stretched film. With the film 20 of the preferred embodiment, it is possible to heat the film 20 once and accomplish adhesion to the frame support surface 16 and tensioning of the film 20 simultaneously.

At the portions 34 of the mirror film 20 that are adhesively secured to the peripheral support surfaces 16 of the frame 12, the film 20 will generally not exhibit the mirror surface qualities exhibited by the central mirror surface portions. However, these portions 34 may either be covered with trim members, or alternately, they may be left exposed as shown.

Figure 4:
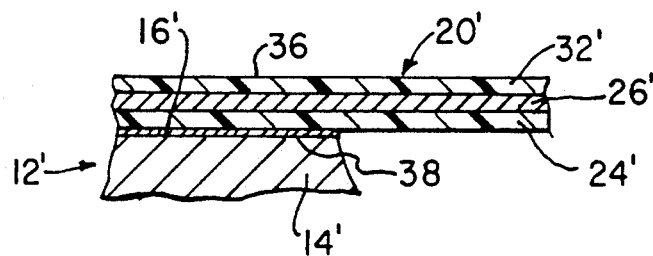
FIG. 4 is a detail cross-sectional view of a mirror according to an alternate embodiment.

Referring now to FIG. 4, an alternate embodiment of the invention is shown, in which the thin plastic sheet 24', is in contact with the frame support surface 16', rather than the protective coating 32'. In this embodiment, the metal reflective layer 26' is protected from environmental damage due to contact with atmosphere and incidental physical contact by the layer 32'. Because the protective coating 32' is at the outer reflective surface 36, it is important that the coating 32' not distort or cloud the reflective properties of the metal layer 26'. In the preferred embodiment of FIGS. 2 and 3, this is not critical.

In order to adhere the mirror film 20' to the frame 12' in the alternate embodiment, it is necessary to apply an additional adhesive 38 to the frame support surface 16' or the thin plastic sheet 24' before bonding can occur. This adhesive 38 can be any known type, such as pressure-sensitive cement, transfer tape, or other adhesives.

In this alternate embodiment, it may be necessary to adhere the mirror film 20' to the frame 12' in a stretched condition, or perhaps tension the mirror film 20' after adhesion.

In the preferred embodiments, the thin plastic sheet has a thickness in the range of 0.0005 to 0.015 inch, although other thicknesses are possible.

Thus, the mirror film of the present invention is seen to protect the reflective metal layer, regardless of whether the metal layer faces inward or outward of the frame. Additionally, with the protective coating against the frame, it can be used for adhering the mirror film to the frame, without the need for extra adhesives or processing steps.

While the embodiments shown and described are fully capable of achieving the objects and advantages of the invention, it is to be understood that these embodiments are shown and described solely for the purpose of illustration and not for limitation.

What is claimed is:

1. A mirror film for attaching to a frame, comprising:
   a layer of thin plastic film;
   a reflective material layer having two surfaces, said reflective layer being bonded to the thin plastic film layer on one surface thereof; and
   a protective coating applied to the other of said surfaces, wherein said protective coating is a resin and formed of a thermoplastic adhesive material for adhering said film directly to said frame.

2. A thin film mirror, comprising:
   a frame, said frame having a support surface;
   a mirror film adhered to said support surface, said mirror film having three layers, a first of said layers being a thin plastic material, a second of said layers being a reflective material, and a third of said layers being a protective coating, said second layer being bonded between said first and third layers, said frame having an aperture such that said third layer is exposed to the atmosphere.

3. A thin film mirror as in claim 2, wherein said third layer adheres to said support surface.

4. A thin film mirror as in claim 3, wherein said third layer is a resin comprised of a thermoplastic adhesive material for adhering said mirror film to said support surface.

5. A thin film mirror as in claim 2, wherein said support surface extends along the periphery of said frame and is substantially co-planar.

6. A thin film mirror as in claim 2, wherein said first layer is comprised of polyethylene terephthalate and said second layer is comprised of a reflective metal.

7. A thin film mirror as in claim 2, wherein said first layer is adhered to said support surface.

8. A thin film mirror as in claim 7, further comprising an adhesive disposed between said support surface and said first layer.

9. A thin film mirror as in claim 2, wherein said third layer is comprised of a plurality of layers of resin.

10. A method of manufacturing a thin film mirror, comprising the steps of:
    juxtaposing a frame to a mirror film, said mirror film having three layers, a first of said layers being a thin plastic material, a second of said layers being a reflective material, and a third of said layers being both a protective resin coating and a thermoplastic adhesive, said second layer being bonded between said first and third layers, said third layer abutting said frame upon juxtaposition;
    heating said film to at least partially melt said third layer; and cooling said film, such that said third layer is adhered to said frame.

11. A thin film mirror, comprising:
a frame, said frame having a support surface;
a mirror film adhered to said support surface, said mirror film having three layers, a first of said layers being a thin plastic material, a second of said layers being a reflective material, and a third of said layers being a protective coating, said second layer being bonded between said first and third layers, wherein said third layer adheres to said support surface.

12. A thin film mirror as in claim 11, wherein said third layer is a resin comprised of a thermoplastic adhesive material for adhering said mirror film to said support surface.

* * * * *